Patented Sept. 22, 1931

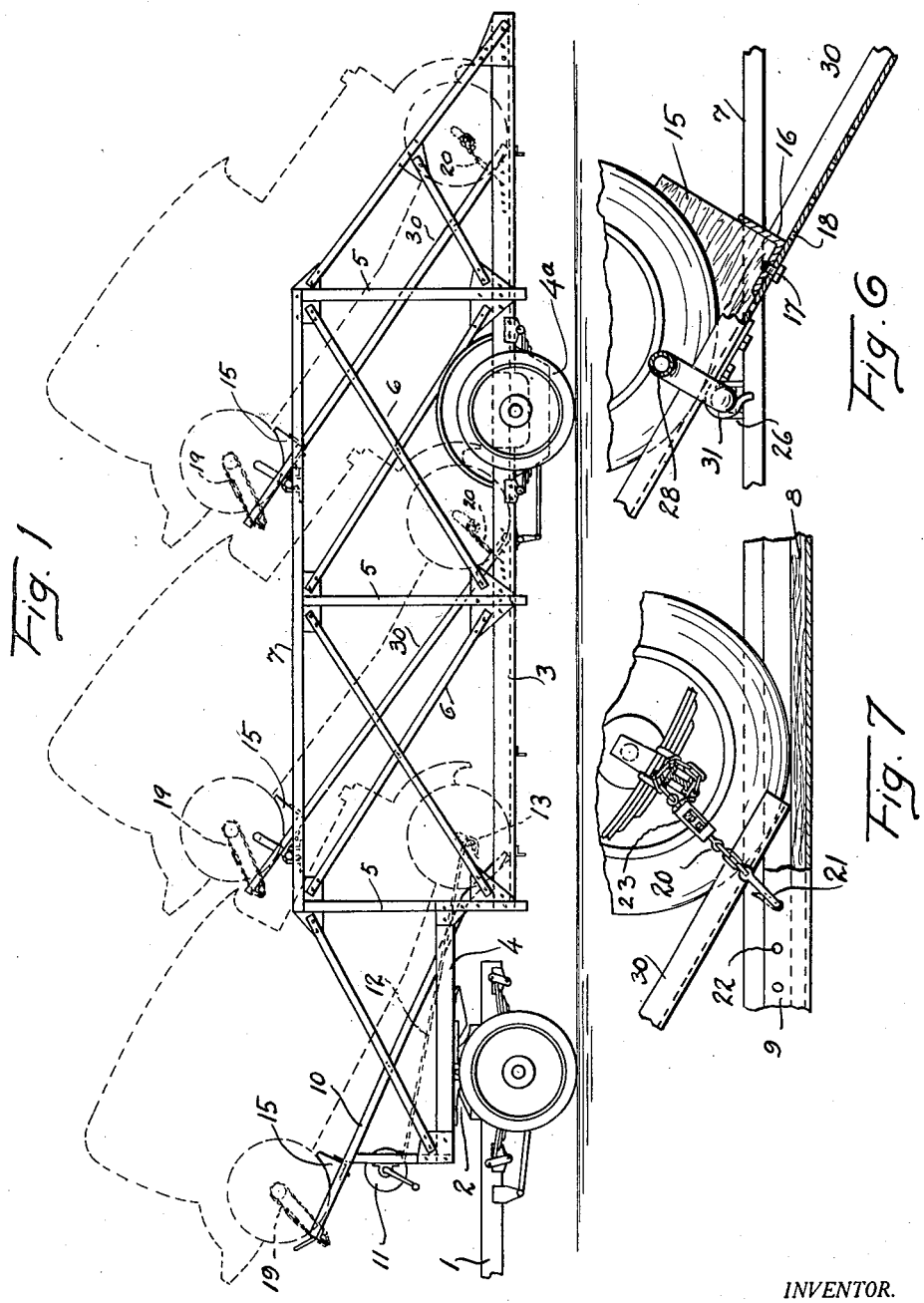

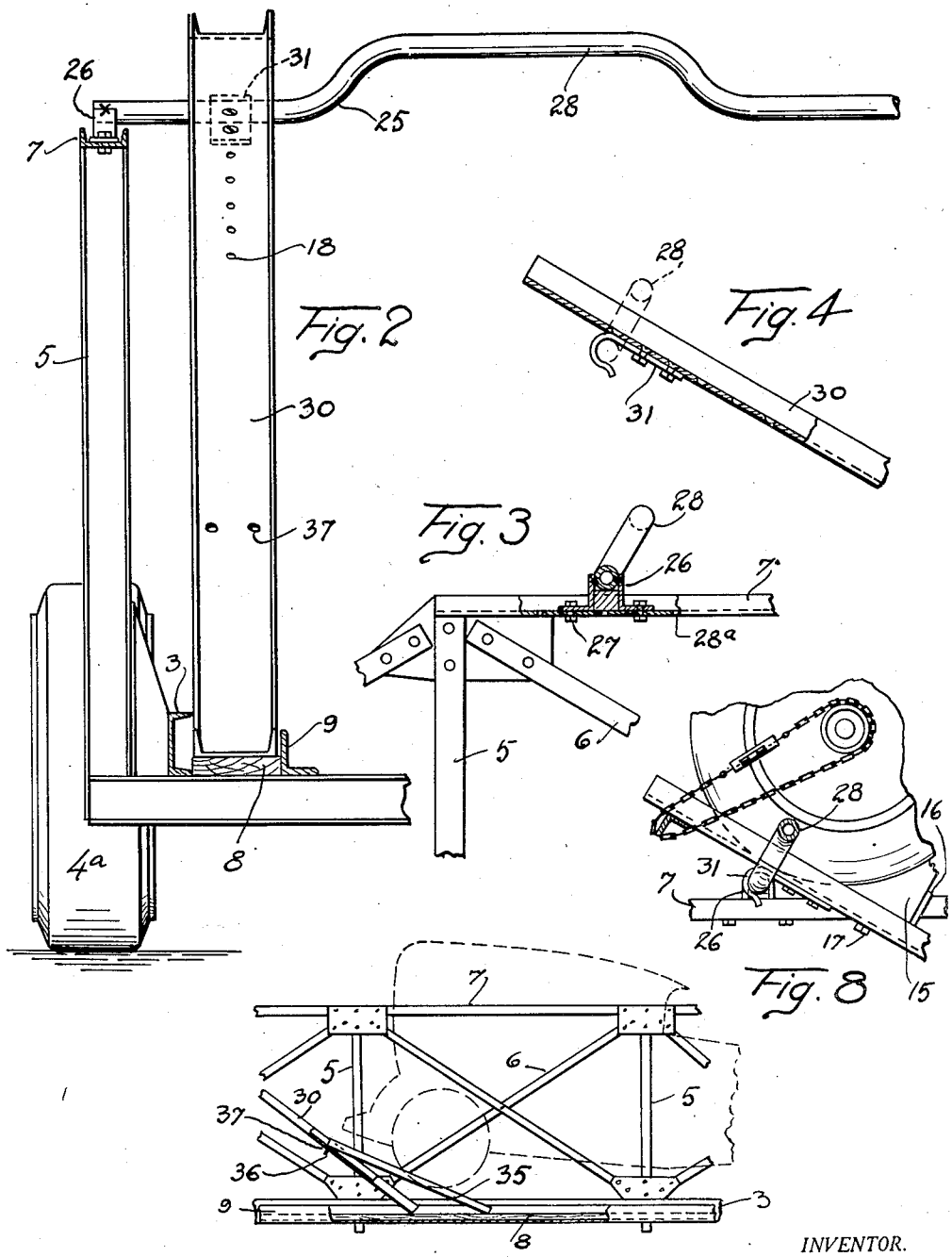

1,824,370

UNITED STATES PATENT OFFICE

FREDERICK M. REID, OF DETROIT, MICHIGAN, ASSIGNOR TO FRUEHAUF TRAILER COMPANY, OF DETROIT, MICHIGAN, A CORPORATION OF MICHIGAN

AUTOMOBILE CARRYING VEHICLE

Application filed September 1, 1928. Serial No. 303,394.

This invention relates to an automobile carrying vehicle. The invention is concerned particularly with the provision of an improved and simplified construction which is especially adaptable for use on a road vehicle for transporting a plurality of of automobiles in inclined and overlapped relation. In accordance with the invention many of the weight supporting parts are light but strong construction which permits of readily placing the parts in position or removing them, which is required in loading or unloading the automobiles. The details of the structure will be better appreciated as the description progresses.

Fig. 1 is a side elevational view of a road vehicle constructed in accordance with the invention for carrying automobiles in inclined and overlapped relation.

Fig. 2 is a transverse sectional view through a portion of the vehicle illustrating the structure of the same.

Fig. 3 is a detail section illustrating how one of the automobile supporting cross tubes is supported by the frame structure of the vehicle.

Fig. 4 is a detail of one of the ramps.

Fig. 5 is a diagrammatic view illustrating the use of additional ramps for initially elevating one end of an automobile.

Fig. 6 is an enlarged detail illustrating how the raised wheels of a vehicle are held in raised position.

Fig. 7 is an enlarged detail illustrating how the front wheels may be tied down to the structure.

Fig. 8 is a detail showing the hold-down for the elevated axle of automobiles.

The vehicle may advantageously take the form of a semi-trailer which is one which is supported at its forward end by a tractor but has wheels of its own for supporting its rear end. In Fig. 1 the rear end of a tractor is referenced 1 and the automobile carrying trailer is supported on the tractor to a suitable fifth wheel connection 2. The trailer has a frame 3 with a forward portion 4 elevated as regards to frame 3, thus to effect a drop frame construction in order to have the frame 3 relatively close to the ground.
Wheels 4 support the rear end of the trailer.

This trailer is provided with a framework on each side of fabricated steel construction preferably of requisite strength for supporting a plurality of automobiles in inclined position as shown. The vehicle shown in Fig. 1 is of sufficient size to carry three automobiles. The trailer, however, can be made to carry a larger number of automobiles, but such showing is unnecessary, inasmuch as it amounts merely to a duplication of parts.

The frame on each side includes uprights 5 with braces 6 and a longitudinal top member 7 preferably in the form of a channel (Fig. 2). The floor of the trailer frame may be open except for tracks 8 which may be of wooden boards. The tracks are preferably bounded on each side so as to guide the wheels of an automobile vehicle therein. For this purpose one side may be bounded by an angle iron 9 and the other by a frame sill 3.

The vehicle is designed to permit loading of the automobiles by moving them in, in succession from the rear end to the forward end and elevating the automobiles in succession as they are moved into place. The forward end of the trailer may be provided with permanently positioned ramps 10 which are preferably of channel construction, and the forwardmost car is moved onto the trailer with the wheels at one end positioned upon the ramps. The automobile may be moved up upon the ramps under its own power or it may be pulled up upon the ramps by circuit means provided for the purpose on the trailer.

This means may take the form of a winch 11 for winding up a cable 12, the end of which may be provided with a hook 15 which may be hooked over the front axle. It is preferable to lift the rear end of the automobile so that the next adjacent automobile overlies the engine. Thus, if the oil leaks from any one of the engines it will not fall upon the cars underneath the same.

After the automobile is in place a chock block 15 is put into place to block the wheels upon the ramps. This is best shown in Fig. 6. For the purpose of securing the chock block, a metal angle piece 16 may be placed in the ramp and held in position by means of bolt 17. The ramp may be provided with a plurality of openings 18 so that the block members may be variously positioned as required for automobiles of varying wheelbase, and height and body design. Also, the rear axle is preferably tied down by means of a strap 19 taken around the rear axle and an adjacent part of the frame structure (Fig. 8). The front axles are preferably tied down also as by the means shown in Fig. 7 which includes a chain 20 provided with a hook 21 which may be inserted in any one of a plurality of holes 22 in the frame and which chain may include a turn buckle 23 for tightening purposes.

As set forth above, the ramps 10 may be permanently positioned. The rearward ramps, however, are removable to permit of loading and unloading of the vehicles. For this purpose a number of cross bars are provided, one of which is shown at 25 in Fig. 2. This cross bar is preferably of tubular form to make for lightness, and has secured to each end a fitting 26 adapted to rest in channel 27 and to be secured thereto by bolts 27. The channel 27 is provided with a number of openings 28 to permit of longitudinal adjustment of the fitting. Each cross tube is preferably bowed as at 28 to provide ample clearance for an automobile positioned immediately below it.

After the first automobile is loaded a cross bar 28 is put into proper place above the second automobile. The second automobile is supported by ramps 30 which are preferably of pressed steel channel construction and which are provided with hooks 31 for hooking over the cross rod 28. The lower end of the ramps merely rest upon tracks 8. The second car is now pulled into place and the chock block 15 inserted, as shown in Fig. 6 and then the axles are tied down after the manner shown in Figs. 7 and 8.

The structure for supporting the third car and all other rearward cars, in the case of vehicles made for transporting more than three automobiles, is identical to that just described in connection with supporting the second car, in that the structure includes removable cross pieces and the removable ramps.

It sometimes happens that the body of an automobile, including the bumpers, tire carriers, trunk, or the like, extends rearwardly beyond the rear wheels to such an extent as to require additional ramps for initially lifting the rear of an automobile in order to clear the car immediately forward of it which is already in an inclined position. For this purpose additional ramps 35 of channel construction may be provided having projection 36 adapted to fit in openings 37 of the ramps 30. The manner in which these are used is shown in Fig. 5. These ramps give the automobile an initial lift to raise the rear end upwardly so as to clear the radiator of the forwardly positioned car. After the automobile has been finally positioned in its inclined transporting position the ramps 35 are removed.

It will be seen therefore that except for the forwardmost automobile that the automobiles are supported by relatively light, quickly removable ramps and crossbars, the crossbars supported by the side frames of the carrying vehicle. The ramps 30 are separate and independent of each other so that one man can easily pick up a ramp and hook it over a crossbar. Also, the cross rods being of tubular construction makes for light weight and ease of removing and assembling.

In unloading the vehicle, the operation is reversed, in that the rear automobile is first removed and then its supporting ramps and cross rod are removed, whereupon the next rearwardmost automobile is unloaded and the two ramps and cross rods removed, and so on down the line until all the vehicles in the vehicle are unloaded.

Claims:

1. In an automobile-carrying vehicle, the combination with a vehicle frame having side walls arranged to permit automobiles to move between them, permanent inclined ramps positioned at the forward end of the vehicle for directly supporting the wheels of an automobile in inclined position, and a plurality of removable ramps spaced from the front to the rear end of the vehicle, each for directly supporting the wheels of an automobile in inclined position, with the automobiles in overlapping relation.

2. In an automobile-carrying vehicle, the combination of a vehicle frame, side walls arranged to permit automobiles to be moved between the walls, removable cross bars extending from wall to wall, each for supporting one end of an automobile in inclined position, and removable ramps detachably carried by the cross bar up which one end of an automobile is adapted to be moved, and removable blocks carried by the ramps for blocking the elevated wheels on the ramps and means for securing the blocks in various positions as regards the length of the ramps.

3. In a vehicle for carrying a plurality of automobiles in an inclined overlapped position, the combination of a pair of side walls on the vehicle, a cross bar, means for detachably connecting the ends of the cross bar to the top of the walls, means for adjusting the cross bar lengthwise of the walls, ramps each provided with a hook for engaging the cross bar and up which the wheels of an automobile are adapted to run to elevate one end of the automobile, and a block carried by each ramp for blocking the wheels of the automobile.

4. In a vehicle for carrying a plurality of automobiles in an inclined overlapped position, the combination of a pair of side walls on the vehicle, a cross bar, means for detachably connecting the ends of the cross bar to the top of the walls, a ramp provided with a hook for engaging the cross bar and up which the wheel of an automobile is adapted to run to elevate one end of the automobile, a block carried by the ramp for blocking the wheels of the automobile, and adjustable means for variously positioning the block on the ramp.

5. In an automobile-carrying vehicle, the combination of a vehicle frame, side walls arranged to permit automobiles to be moved between the walls, removable cross bars extending from wall to wall, each for carrying the weight of one end of an automobile in inclined position, and removable ramps detachably carried by the cross bars for directly supporting the wheels of an automobile as it is carried and up which one end of an automobile is adapted to be moved.

6. In an automobile carrying vehicle, the combination of a vehicle frame having spaced side walls arranged to permit automobiles to be moved in between the walls, a plurality of cross bars extending across the vehicle frame from wall to wall, means detachably connecting said cross bars to the walls, said cross bars being bowed upwardly in their central portion and having substantially straight ends between the central portion and the point of connection with the walls and each being adapted to support an automobile in inclined position with the wheels of the automobile located substantially at said straight portions, said automobiles being in inclined and overlapped relation and the bowed bars providing clearance for the underlying automobile.

7. In a vehicle for carrying automobiles in an inclined position, the combination of side frames, cross bars extending transversely of the vehicle from one side frame to the other, means detachably connecting the cross bars adjacent the top of the frames, a pair of ramps associated with each cross bar and each ramp having a hook adapted to engage directly over the cross bar, said automobiles being adapted to be run up the ramps with its uppermost wheels positioned substantially over the cross bar, and means for holding the automobile in this position.

In testimony whereof I affix my signature.

FREDERICK M. REID.